(12) United States Patent
Wang et al.

(10) Patent No.: US 10,050,371 B2
(45) Date of Patent: Aug. 14, 2018

(54) COMPOSITE CONNECTION SOCKET

(71) Applicants: Pei-Lun Wang, Keelung (TW); Xinping Luo, Hengnan County (CN)

(72) Inventors: Pei-Lun Wang, Keelung (TW); Xinping Luo, Hengnan County (CN)

( * ) Notice: Subject to any disclaimer, the term of this patent is extended or adjusted under 35 U.S.C. 154(b) by 0 days.

(21) Appl. No.: 15/682,544

(22) Filed: Aug. 22, 2017

(65) Prior Publication Data

US 2017/0352976 A1   Dec. 7, 2017

Related U.S. Application Data

(63) Continuation-in-part of application No. 15/241,726, filed on Aug. 19, 2016, now abandoned.

(30) Foreign Application Priority Data

Aug. 19, 2015   (TW) .............................. 104213346 U

(51) Int. Cl.
| | |
|---|---|
| *H01R 24/00* | (2011.01) |
| *H01R 13/514* | (2006.01) |
| *G06F 13/42* | (2006.01) |
| *G06F 13/38* | (2006.01) |
| *H01R 13/516* | (2006.01) |
| *H01R 31/06* | (2006.01) |
| *H01R 24/60* | (2011.01) |
| *H01R 27/00* | (2006.01) |
| *H01R 24/76* | (2011.01) |
| *H01R 107/00* | (2006.01) |

(52) U.S. Cl.
CPC ......... *H01R 13/514* (2013.01); *G06F 13/385* (2013.01); *G06F 13/4282* (2013.01); *H01R 13/516* (2013.01); *H01R 24/60* (2013.01); *H01R 27/00* (2013.01); *H01R 31/065* (2013.01); *H01R 24/76* (2013.01); *H01R 2107/00* (2013.01)

(58) Field of Classification Search
CPC ......... H01R 23/02; H01R 24/60; H01R 24/62
USPC ............................ 439/660, 218, 222
See application file for complete search history.

(56) References Cited

U.S. PATENT DOCUMENTS

2005/0048846 A1\* 3/2005 Suzuki ................ H01R 23/688
439/660

\* cited by examiner

*Primary Examiner* — Phuong Dinh
(74) *Attorney, Agent, or Firm* — Chun-Ming Shih; HDLS IPR Services

(57) ABSTRACT

A composite connection socket includes a metal housing, an insulative main body, a first row conductive terminal and a second row conductive terminal. The metal housing includes an accommodating space formed therein, and the insulative main body is received inside the accommodating space. The insulative main body includes a first side plate, a second side plate and a base; the first side plate and the second side plate are arranged corresponding to each other and protrude from the base. The first row conductive terminal is arranged on the first side plate and complies with a micro USB communication protocol interface. The second row conductive terminal is arranged on the second side plate and complies with a lightning standard interface. The composite connection socket is able to commonly accommodate two cable connectors of different standards of a micro USB connector or a lightning connector inserted therein.

1 Claim, 6 Drawing Sheets

COMPOSITE CONNECTION SOCKET

CROSS-REFERENCE TO RELATED APPLICATIONS

This application is a continuation-in part application of U.S. application Ser. No. 15/241,726 filed on Aug. 19, 2016, which claims priority to TW104213346 filed Aug. 19, 2015. The entire disclosure is incorporated herein by reference.

BACKGROUND OF THE INVENTION

Field of the Invention

The present invention is related to a connector, in particular, to a composite connection socket for common use of a universal serial bus, such as Micro USB interface or a Lightning interface.

Description of Related Art

In recent years, various types of portable electronic devices including such as smartphones and tablet computers, have already replaced personal computers in the uses of processing information of living, office matters and other businesses such that seamless connection with the network can be made everywhere at any time; therefore, such devices have become one of the essentials to the living of the general public.

Users may have portable electronic devices of various types and brands, and each portable electronic device has its own operating system different, interface socket, transmission cables etc. while using such data cables for information exchange, charging or other matters etc. For example, the most common operating systems are the iOS and Android developed by the companies of Apple and Google respectively, and these two companies use their own transmission and communication protocols such that the cable sockets used are also different from each other. Apple Inc. uses the Lightning interface, whereas Google Inc. may use a universal serial bus, such as Micro USB, and so on. Consequently, users may be required to carry two different cables for uses on different portable electronic devices, leading to difficulty and inconvenience of use by the users. Moreover, in the event where users insert erroneous connectors into an incompatible interface socket, it can also cause damages on the interface socket of the portable electronic device.

In view of the above, it is an objective of the inventor of the present invention to provide a solution capable of overcoming the aforementioned problems of low compatibility of the signal interface sockets associated with the currently existing portable electronic devices.

SUMMARY OF THE INVENTION

An objective of the present invention is to provide a composite connection socket allowing common use and insertion of a universal serial bus interface and a Lightning interface therein.

To achieve the aforementioned objective, the present invention provides a composite connection socket, applicable to a universal serial bus interface or a Lightning interface, comprising a metal housing, an insulative main body, a first row conductive terminal and a second row conductive terminal. The metal housing includes an accommodating space formed therein, and the insulative main body is received inside the accommodating space. The insulative main body comprises a first side plate, a second side plate and a base; the first side plate and the second side plate are arranged corresponding to each other and protrude from the base respectively. The first row conductive terminal is arranged on the first side plate, and the first row conductive terminal complies with a Micro USB communication protocol interface. The second row conductive terminal is arranged on the second side plate, and the second row conductive terminal complies with a Lightning standard interface.

The present invention is also of the following advantageous technical effects: one single interface socket interface can be used to commonly accommodate two cable connectors of different standards, allowing a Micro USB connector or a Lightning connector to be inserted into such interface socket. Therefore, regardless whether users use a Micro USB connector of a Micro USB cable or a Lightning connector of a Lightning cable, such connectors can both be properly inserted into the composite connection socket of the present invention. As a result, the likelihood of damages on the socket due to insertion of erroneous connectors into the portable electronic device can be reduced.

DETAILED DESCRIPTION OF THE INVENTION

The following provides a detailed description of the present invention and technical contents thereof along with the accompanied drawings. However, it can be understood that the accompanied drawings are provided for illustration purpose only, which shall not be used to limit the scope of the present invention.

As shown in FIG. 1 to FIG. 8, the present invention provides a composite connection socket 100, applicable to a universal serial bus (USB) cable 10 with a USB serial interface or a Lightning cable 30 with a Lightning interface. The Lightning interface is a specialized standard developed by the Apple Inc., and the number of pins of such connector is 8 pins, which is characterized in that it can be inserted on either side of the connector and is of a size similar to Micro USB. Micro USB is a 5-pin connector, and the height of the pins is reduced by half of the height of pins of Mini-USB connector while the widths of both connectors are the same. Currently, Micro-USB is known to be a standard interface for mobile device data and power transfer.

Figure 1:
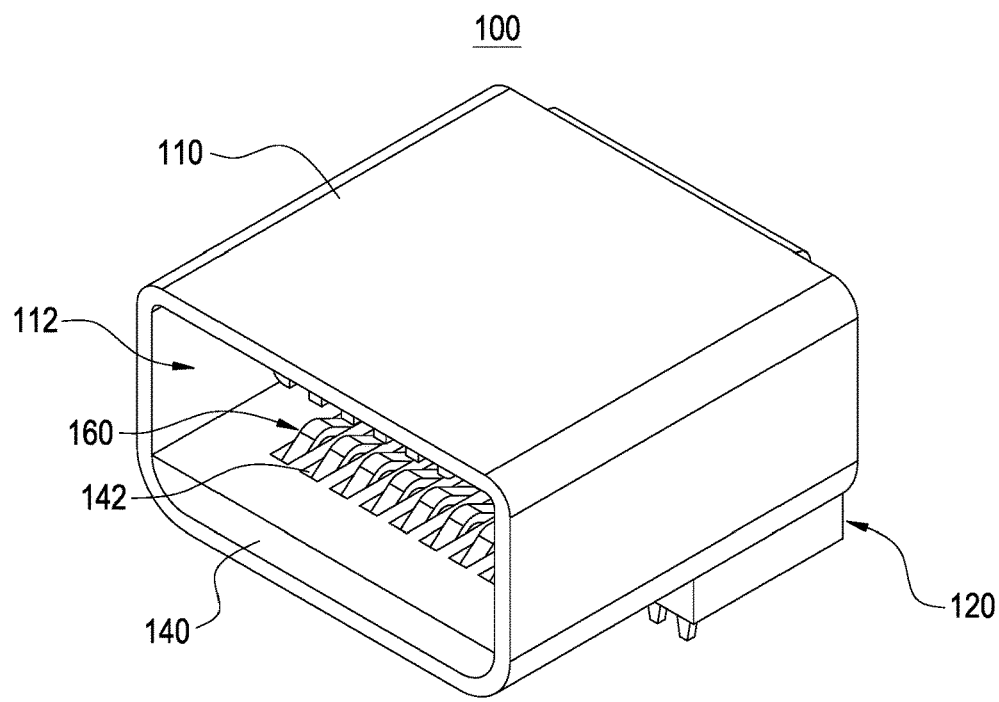
FIG. 1 is a perspective view of a composite connection socket of the present invention.
Figure 4:
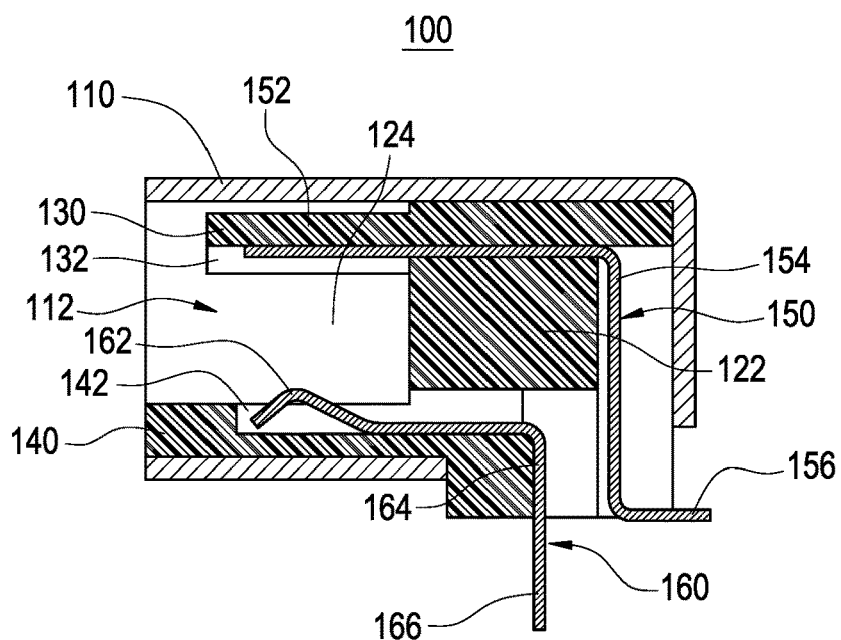
FIG. 4 is a cross sectional view of the composite connection socket of the present invention.

As shown in FIG. 1 and FIG. 4, the composite connection socket 100 comprises a metal housing 110, an insulative main body 120, a first row conductive terminal 150 and a second row conductive terminal 160. The metal housing 110 includes an accommodating space 112 formed therein, and the insulative main body 120 is received inside the accommodating space 112. The insulative main body 120 comprises a first side plate 130, a second side plate 140 and a base 122. The first side plate130 and the second side plate 140 are arranged corresponding to each other and protrude from the base 122 respectively; wherein the first slide plate 130 is received inside the accommodating space 112 with a separation gap, and one side of the second side plate is attached onto an inner surface of the metal housing 110.

Figure 2:
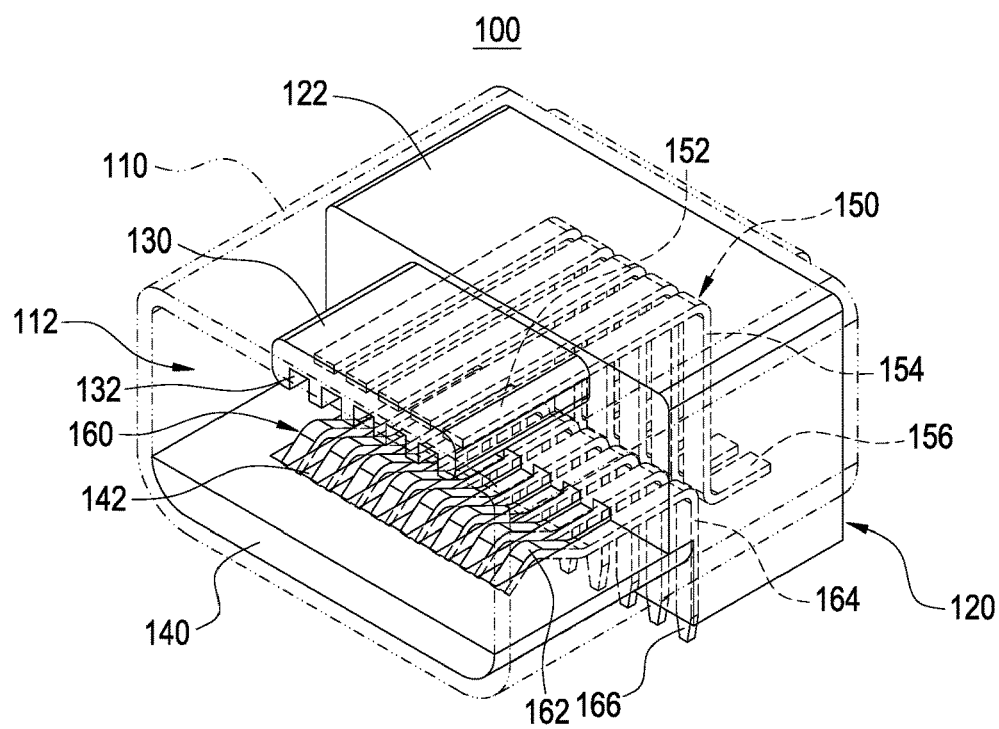
FIG. 2 is a see-through view of the composite connection socket of the present invention.
Figure 3:
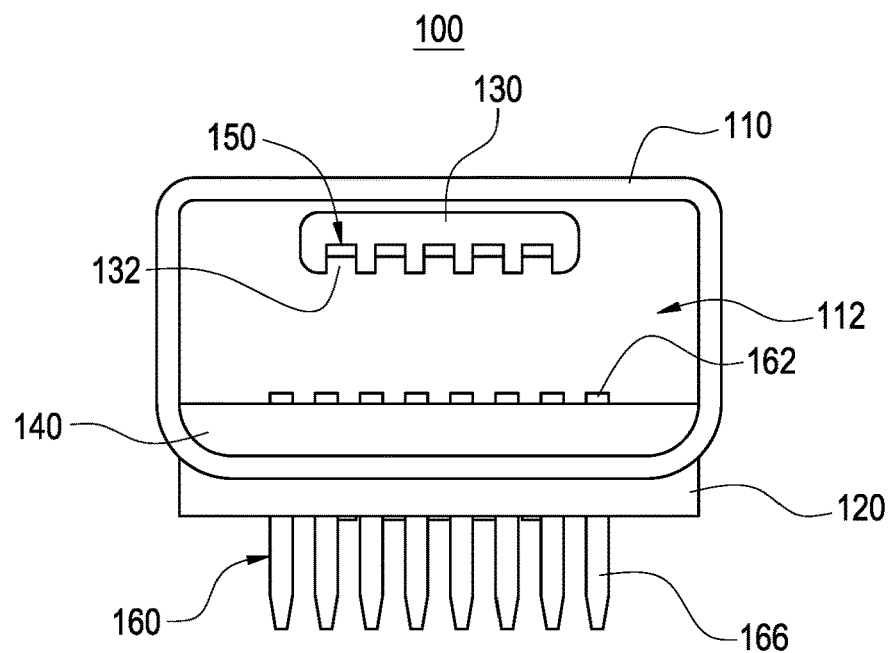
FIG. 3 a front view of the composite connection socket of the present invention.

The first row conductive terminal 150 is arranged on the first side plate 130, and the first row conductive terminal 150 preferably complies with a Micro USB communication protocol interface. The second row conductive terminal 160 is arranged on the second side plate 140, and the second row conductive terminal 160 complies with a Lightning standard interface. As shown in FIG. 2 and FIG. 4, the Micro USB communication protocol interface and the Lightning standard interface are arranged corresponding to each other inside the accommodating space 112.

Furthermore, as shown in FIG. 4, the first side plate 130 is disposed corresponding to the second side plate 140, a gap 124 is formed between the first side plate 130 and the second side plate 140, and the base 122 is disposed in the gap 124 to separate the first side plate 130 from the second side plate 140. In this embodiment, the gap 124 preferably communicates with the accommodating space 112 for accommodating the match connector (not illustrated).

The first row conductive terminal 150 respectively comprises a first contact portion 152, a first positioning portion 154 and a first soldering portion 156. The first contact portion 152 is arranged on one side of the first side plate 130, the first positioning portion 154 is secured onto the base 122, and the first soldering portion 156 protrudes out of the insulative main body 120. The first side plate130 further includes a plurality of concave slots 132 formed thereon, and each one of the concave slots 132 is provided for receiving each of the first contact portions 152 or each of the first conductive terminals 150 therein. In this embodiment, preferably, the first positioning portion 154 and the first contact portion 152 are flatly attached onto a surface of the first side plate 130, and the first soldering portion 156 is perpendicular to the first positioning portion 154.

The second row conductive terminal 160 respectively comprises a second contact portion 162, a second positioning portion 164 and a second soldering portion 166. The second contact portion 162is elastically arranged on one side of the second side plate 140; the second positioning portion 164 is secured onto the base 122; the second soldering portion 166 protrudes out of the insulative main body 120. The second side plate 140 further includes a plurality of opening slots 142 formed thereon, and each of the second contact portions 162 of each of the second conductive terminals 160 is moveably arranged in each of the opening slot 142. In this embodiment, preferably, the second contact portion 162 is arched and disposed on the second side plate 140, and the second soldering portion 166 is parallel to the second positioning portion 164.

Figure 6:
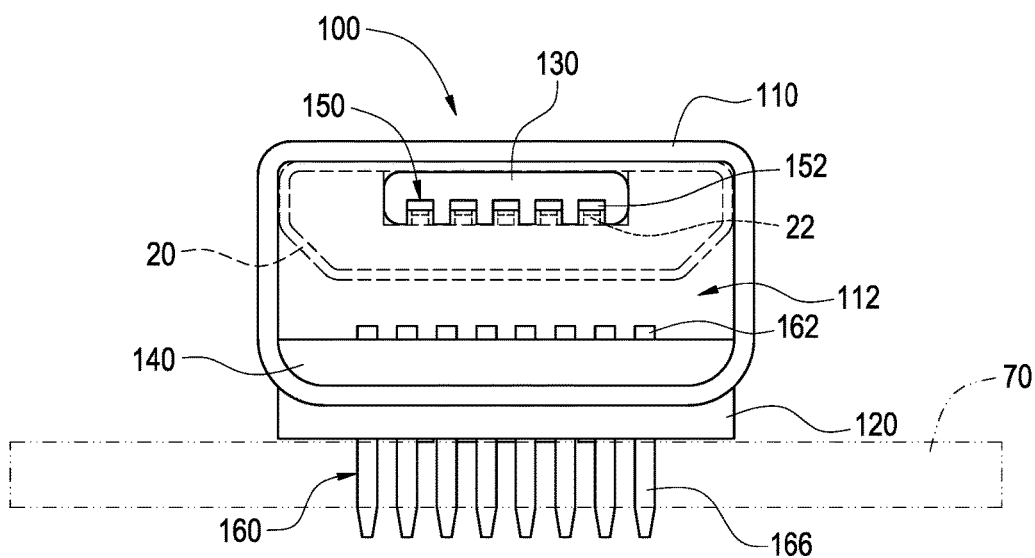
FIG. 6 is an illustration showing the socket of FIG. 5 after the insertion.
Figure 8:
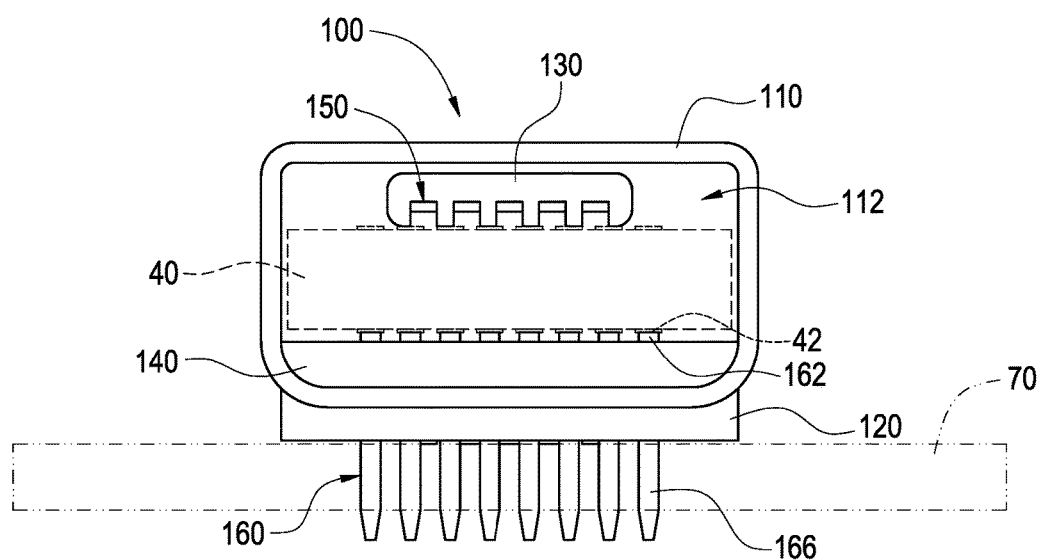
FIG. 8 is an illustration showing the socket of FIG7 after the insertion.

As shown in FIG. 4, FIG. 6 and FIG. 8, each one of the first soldering portions 156 is soldered onto the circuit board 70 preferably via the method of Surface Mounting Technology (SMT). Each one of the second soldering portions 166 is soldered onto the circuit board 70 via the method of Dual In-Line Package (DIP). However, in other embodiments, it can be understood that each one of the first soldering portion 156 and each one of the second soldering portions can both be using SMT or DIP method at the same time, or other appropriate methods are also applicable for soldering onto the circuit board 70.

Figure 5:
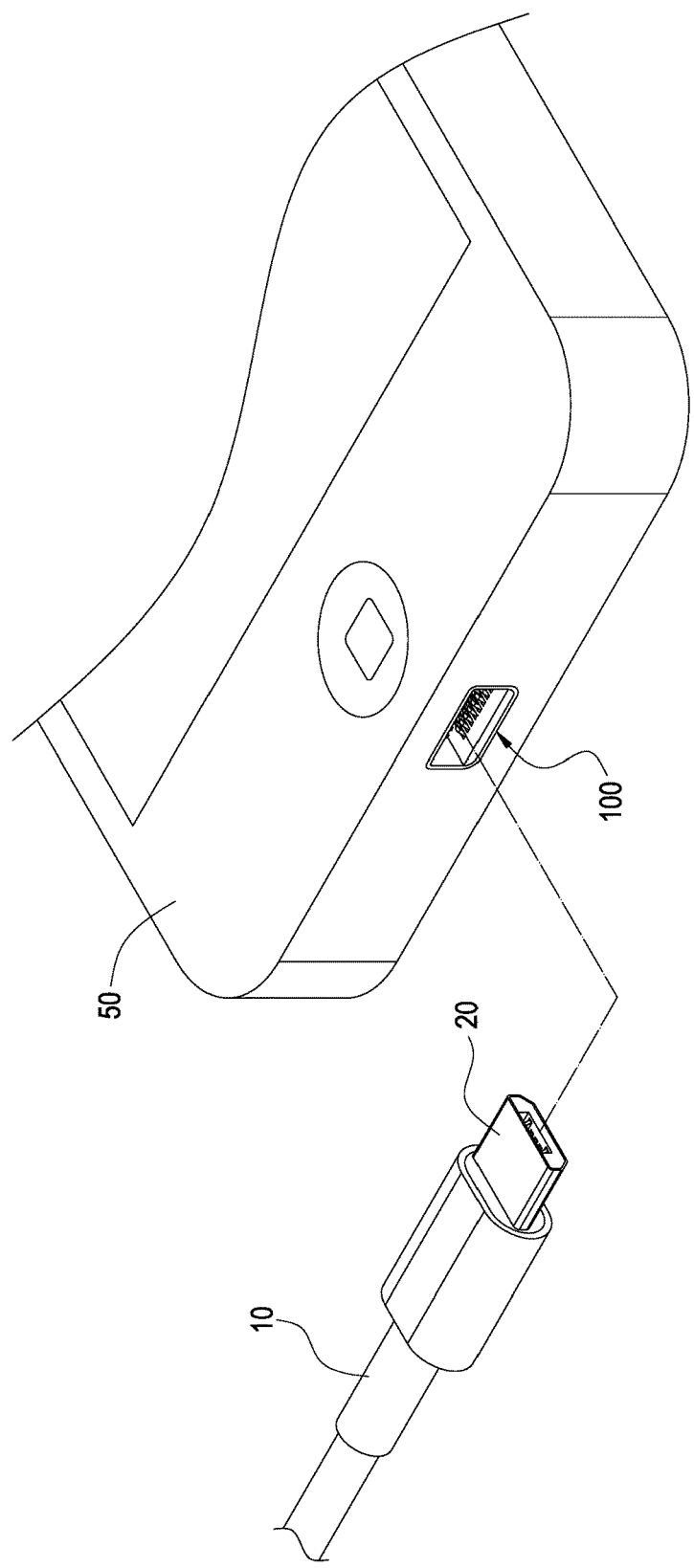
FIG. 5 is a perspective view showing the composite connection socket of the present invention provided for a universal serial bus cable to be inserted therein.
Figure 7:
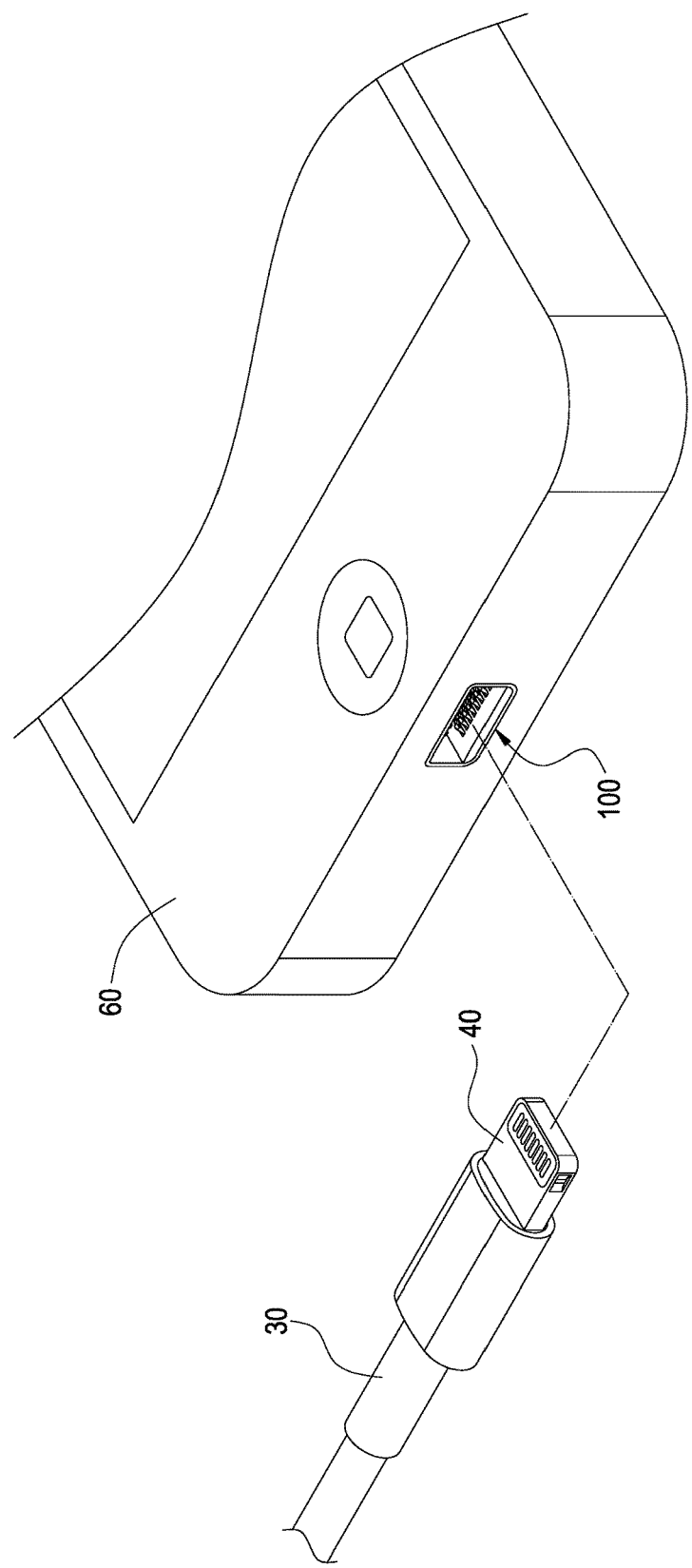
FIG. 7 is a perspective view showing the composite connection socket of the present invention provided for a Lightning cable to be inserted therein.

Please refer to FIG. 5 to FIG. 8 again. When the composite connection socket 100 of the present invention is provided on a currently existing portable electronic device 50, then regardless whether the user is using a Micro USB connector 20 of a Micro USB cable or a Lightning connector 40 of a Lightning cable 30, both of such connectors can be correctly inserted into the socket 100 of the present invention. Therefore, the likelihood of damages on the socket due to insertion of erroneous connector on the portable electronic device 50 can be reduced.

Moreover, as shown in FIG. 5 and FIG. 6, when the user uses a Micro USB connector 20 of a Micro USB cable 10 for insertion into the socket 100, the Micro USB connector 20 is able to be inserted (locked) into the upper portion of the socket 100. Each one of the contact points 22 of the Micro USB connector 20 is able to electrically contact with each one of the first contact portions 152 in order to perform activities of data transmission or power charging or both.

Furthermore, as shown in FIG. 7 and FIG. 8, when the user uses a Lightning connector 40 of a Lightning cable 30 for insertion into the socket 100, the Lightning socket 40 is able to be inserted at the lower portion of the socket 100. At this time, the Lightning socket 400 is positioned between the first side plate 130 and the second side plate 140. Moreover, each one of the contact points 42 of the Lighting connector 40 is able to electrically contact with each one of the second contact portions 162 in order to perform activities of data transmission or power charging or both. As a result, one single composite connection socket 100 of the present invention can be used to accommodate cable connectors of two different standards; in other words, both Micro USB connector 20 and Lightning connector 40 can be commonly used on one single socket. Therefore, the likelihood of damages of the socket 100 can be advantageously reduced.

In view of the above, the embodiments disclosed above is for illustrative purpose only to describe the present invention, which shall not be used to limit the scope of the present invention. The scope of the present invention shall be determined based on the claims enclosed hereafter, which covers all legitimate equivalent embodiments and shall not be limited to the aforementioned embodiments only.

What is claimed is:

1. A composite connection socket, applicable to a universal serial bus (USB) interface or a lightning interface, comprising:

a metal housing having an accommodating space formed therein;

an insulative main body received inside the accommodating space, the insulative main body comprising a first side plate, a second side plate and a base, the first side plate being shorter than the second side plate and the plates arranged corresponding to each other and protruded from the base, wherein the first side plate is disposed corresponding to the second side plate, a gap is formed between the first side plate and the second side plate, and the base is disposed in the gap to separate the first side plate from the second side plate, wherein a slit exists between the metal housing and the first side plate;

a first row conductive terminal arranged on the first side plate, the first row conductive terminal complying with a micro USB communication protocol interface; and a second row conductive terminal arranged on the second side plate, the second row conductive terminal complying with a lightning standard interface.

* * * * *